J. G. SWALLOW.
SEALING CAP FOR ELECTRICAL APPARATUS.
APPLICATION FILED MAR. 6, 1908.
905,761.
Patented Dec. 1, 1908.
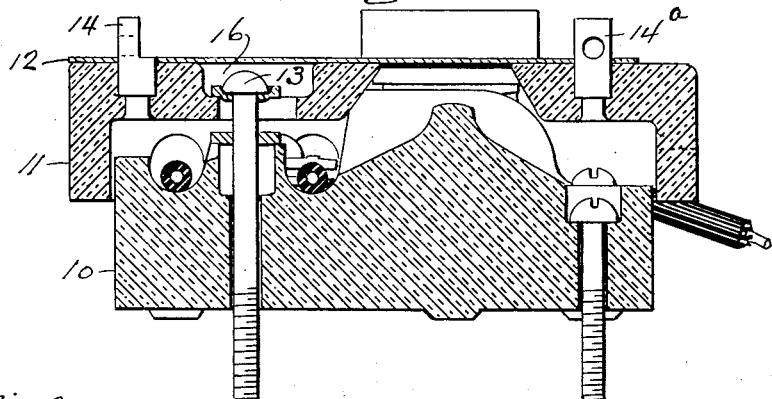
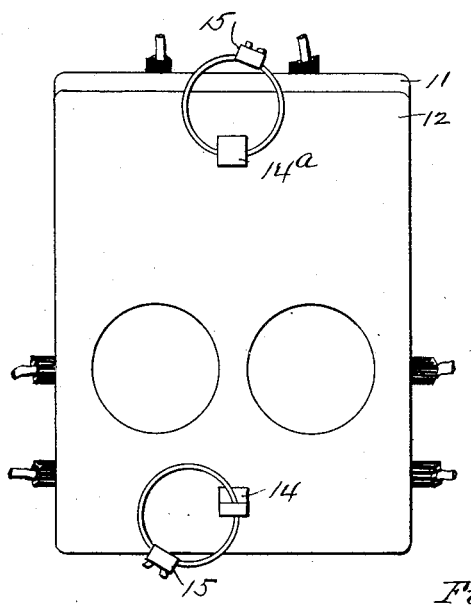
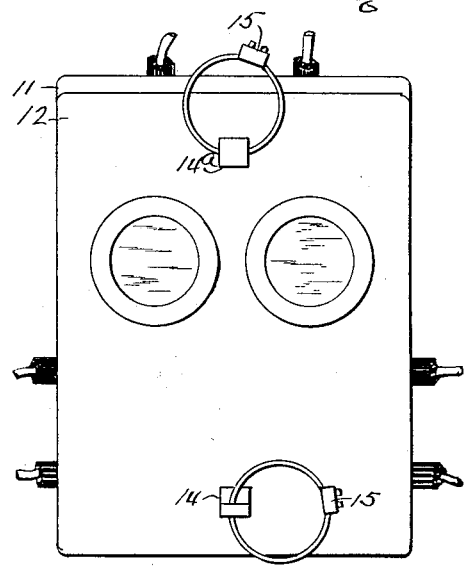
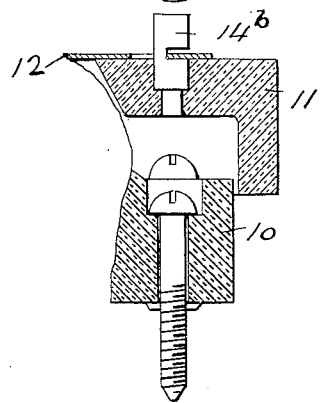
WITNESSES
INVENTOR
Joseph G. Swallow
BY
Howson and Howson
ATTORNEYS

UNITED STATES PATENT OFFICE.

JOSEPH G. SWALLOW, OF BROOKLYN, NEW YORK, ASSIGNOR OF ONE-HALF TO FRANK W. SMITH, OF NEW YORK, N. Y.

SEALING-CAP FOR ELECTRICAL APPARATUS.

No. 905,761.

Specification of Letters Patent.

Patented Dec. 1, 1908.

Application filed March 3, 1908. Serial No. 419,525.

*To all whom it may concern:*

Be it known that I, JOSEPH G. SWALLOW, a citizen of the United States of America, residing in the borough of Brooklyn, county of Kings, and State of New York, have invented a certain new and useful Improvement in Sealing-Caps for Electrical Appliances, of which the following is a specification.

My invention relates to sealing caps for electrical appliances and particularly to caps of the construction described and claimed in my Patent 866,977 of September 24, 1907, and my invention consists of the improvements set forth hereinafter.

In the accompanying drawings, Figure 1 is a sectional elevation of a cut-out block showing my construction, and Figs. 2 and 3 are plan views of the same with the reversible cap in different positions; and Fig. 4 is a broken sectional elevation showing a modified construction.

The main features of the device here illustrated are the same as those shown in my above mentioned patent, to wit, a base 10 carrying the electrical appliance and its appurtenances here shown to be a cut-out provided with fuse plugs, an insulating cover 11 therefor and a supplemental reversible cover or cap 12 secured by seals 15, the shackles of which pass through the perforated lugs 14 and 14ª. Instead however of making the securing screw 13 by which the base is held to its support serve also as the means for carrying the seal as shown in my patent above mentioned, I prefer to separate the lugs 14 and 14ª from the screw and thoroughly insulate these parts from each other. This is most satisfactorily done by embedding the lugs in the cover 11 while the head of the screw is received in an independent recess 16 as shown, although it may be accomplished in other ways.

The advantage of this construction is an added element of safety. While the securing screw shown in my earlier patent is entirely insulated from any of the electrically live parts of the appliance, there is nevertheless a possible danger that it may penetrate the support to some electrically charged body and thus, since the lugs 14 and 14ª are exposed, introduce an element of danger in the appliance. This is entirely obviated if the securing screw is kept beneath the reversible cap and the exposed lug insulated therefrom, as described.

The device is shown as applied to a cut-out block, but it will be readily understood that either in its present form or in the form shown in my above mentioned patent, it may be adapted to any suitable electrical appliance without departing from my invention.

The improved construction may be varied in its details without departing from the invention. Thus as shown in Fig. 4, one lug 14ᵇ instead of being transversely perforated to permit the passage of the shackle therethrough, may be cut away to form a slot of sufficient size to permit the cover or cap 12 to be drawn into the same and secured thereby without the aid of a seal. This construction necessitates the placing of the holes 16 in the cap slightly closer together in order to secure the registry of the hole and the lug 14ª after the cap has been slipped into the slot in lug 14ᵇ. The modification has the advantage however of expediting the assembling and sealing of the parts, since one of the seals is thereby wholly dispensed with.

I claim as my invention:

1. An electric appliance and its appurtenances having a carrying base, a reversible cap provided with an opening for the passage therethrough of an appurtenance to said appliance when in one position and adapted to cover the space occupied by said appurtenance when in reversed position, in combination with means to secure said base to a support and means insulated from said securing means and passing through the reversible cap to carry a seal for the latter.

2. An electric appliance and its appurtenances having a base and an insulating cover therefor, in combination with a reversible cap provided with an opening for the passage therethrough of an appurtenance to said appliance when in one position and adapted to cover the space occupied by said appurtenance when in reversed position, in combination with means to secure said base to a support and means insulated from said securing means and passing through the reversible cap to carry a seal for the latter.

3. An electric appliance having a base and an insulating cover therefor, in combination with a reversible cap provided with an opening for the passage therethrough of an appurtenance to said appliance when in one position and adapted to cover the space occupied by said appurtenance when in reversed position, in combination with lugs carried by said cover passing through said reversible cap and means in connection with said lugs for sealing said cover and cap together.

4. An electric appliance having a base and an insulating cover therefor, in combination with a perforated reversible cap provided with an opening for the passage therethrough of an appurtenance to said appliance when in one position and adapted to cover the space occupied by said appurtenance when in reversed position, in combination with lugs carried by said cover passing through the perforations of the reversible cap, one of said lugs being slotted to receive said cap and means in connection with the other lug to seal said cover and reversible cap together.

In testimony whereof I have signed my name to this specification, in the presence of two subscribing witnesses.

JOSEPH G. SWALLOW.

Witnesses:
  WILLIAM ABBE,
  L. H. GROTE.